United States Patent [19]
Dolby

[11] 3,720,794
[45] March 13, 1973

[54] DUAL MAGNETIC TAPE CASSETTE TRANSPORT AND CARROUSEL APPARATUS

[75] Inventor: Dale P. Dolby, Los Altos, Calif.

[73] Assignee: Ampex Corporation, Redwood City, Calif.

[22] Filed: March 29, 1971

[21] Appl. No.: 128,966

[52] U.S. Cl...179/100.2 PM, 179/100.2 ZA, 226/95, 242/184

[51] Int. Cl. ........................G11b 15/38, G11b 15/56

[58] Field of Search.179/100.2 PM, 100.2 P, 100.2 T,179/100.2 ZA, 100.2 Z; 226/95, 97; 242/182, 183, 184, 185; 340/174.1 C

[56] References Cited

UNITED STATES PATENTS

| | | | |
|---|---|---|---|
| 3,617,650 | 11/1971 | Morello | 179/100.2 PM |
| 3,576,282 | 4/1971 | Epina | 226/97 |
| 3,499,614 | 3/1970 | Badum | 179/100.2 PM |
| 3,314,729 | 4/1967 | Beaumeister | 226/97 |
| 3,525,086 | 8/1970 | Lichowsky | 340/174.1 C |

*Primary Examiner*—Bernard Konick
*Assistant Examiner*—Jay P. Lucas
*Attorney*—Robert G. Clay

[57] ABSTRACT

A self-threading transport employs vacuum to pull supply and takeup loops of tape from the side of a tape cassette. A third intermediate loop is also pulled, within which is positioned a retractable vacuum capstan, and the tape is at the same time engaged with rotary video and longitudinal audio heads. For rewind, the capstan is retracted and the takeup loop alone is maintained, the heads being spaced away from the takeup loop tape path. Two such transports are provided with a cassette storing carrousel therebetween for uninterrupted programmed play.

16 Claims, 5 Drawing Figures

INVENTOR
DALE P. DOLBY

BY

ATTORNEY

INVENTOR.
DALE P. DOLBY
BY
Robert H. Clay
ATTORNEY

INVENTOR.
DALE P. DOLBY
BY Robert H. Clay
ATTORNEY

INVENTOR.
DALE P. DOLBY

BY

Robert H. Clay

ATTORNEY

DUAL MAGNETIC TAPE CASSETTE TRANSPORT AND CARROUSEL APPARATUS

BACKGROUND OF THE INVENTION

This invention relates to magnetic tape transports, and particularly to automatic loading and threading cassette machines.

Magnetic tape cassette transports, particularly for recording and playing television programs, have previously been devised for use in television broadcasting stations, for example, where they are useful in playing "spot announcements" or "commercials∓ of short duration. Tape of a length suitable for a 5 or 6-minute television feature can be stored in a cassette of manageable size. A large number of such cassettes can be stored in an automatic loading apparatus and supplied one-by-one, and in any desired pre-programmed order, by the mechanism. If two transports are supplied, uninterrupted play can be achieved, for one transport can be playing while the other is rewinding, unloading, and reloading and threading the next cassette in the programmed sequence. Cassettes and apparatus of this type are disclosed in assignee's co-pending applications Ser. No. 809,759 "Automatically Threading Tape Transport" by Alfred P. Stahler, filed Mar. 24, 1969; Ser. No. 24,579 "Magnetic Tape Cassette Hub" by Dale P. Dolby, filed Apr. 1, 1970 now U.S. Pat. No. 3,602,451; Ser. No. 24,760 "Cassette Feeding Apparatus" by Alfred F. Stahler, filed Apr. 1, 1970 now U.S. Pat. No. 3,666,201; Ser. No. 24,762 "Cassette Feeding Apparatus" by David Williams, filed Apr. 1, 1970; and Ser. No. 24,763 "Tape Positioning Apparatus" by Bryan F. Kember, filed Apr. 1, 1970 now U.S. Pat. No. 3,692,256.

In the prior apparatus, a non-retractable capstan engages the oxide or recorded side of the tape at the apex of a V-shaped vacuum column arrangement in the walls of which the transducing heads are mounted. A certain minimum amount of wrap of the tape around the capstan is required to ensure optimum functioning without slip; and each of the longitudinal heads requires a minimum wrap for effective contact with the tape. In certain uses these competing requirements are no problem, but in others e.g. with a larger number of heads, the sum of the required wrap angles is too great for the V-shaped geometry restriction, and a different geometry is needed.

Accordingly, it is an object of the present invention to provide a magnetic tape video cassette transport that has greater flexibility in the number of heads and the sum of the wrap angles that can be accommodated.

It is another object to provide a two-transport, carrousel loading, automatic pre-programmable machine of the type described above for the recording and playing of video tape cassettes.

SUMMARY OF THE INVENTION

The above and other objects are achieved in an apparatus described as follows. A self-threading transport employs vacuum to pull supply and takeup loops of tape from the side of a tape cassette. A third intermediate loop is also pulled, within which is positioned a retractable vacuum capstan, and the tape is at the same time engaged with rotary video and longitudinal audio heads. For rewind, the capstan is retracted and the takeup loop alone is maintained, the heads being spaced away from the takeup loop tape path. Two such transports are provided with a cassette storing carrousel therebetween, for uninterrupted programmed play.

DETAILED DESCRIPTION OF THE PREFERRED EMBODIMENTS

Figure 1:
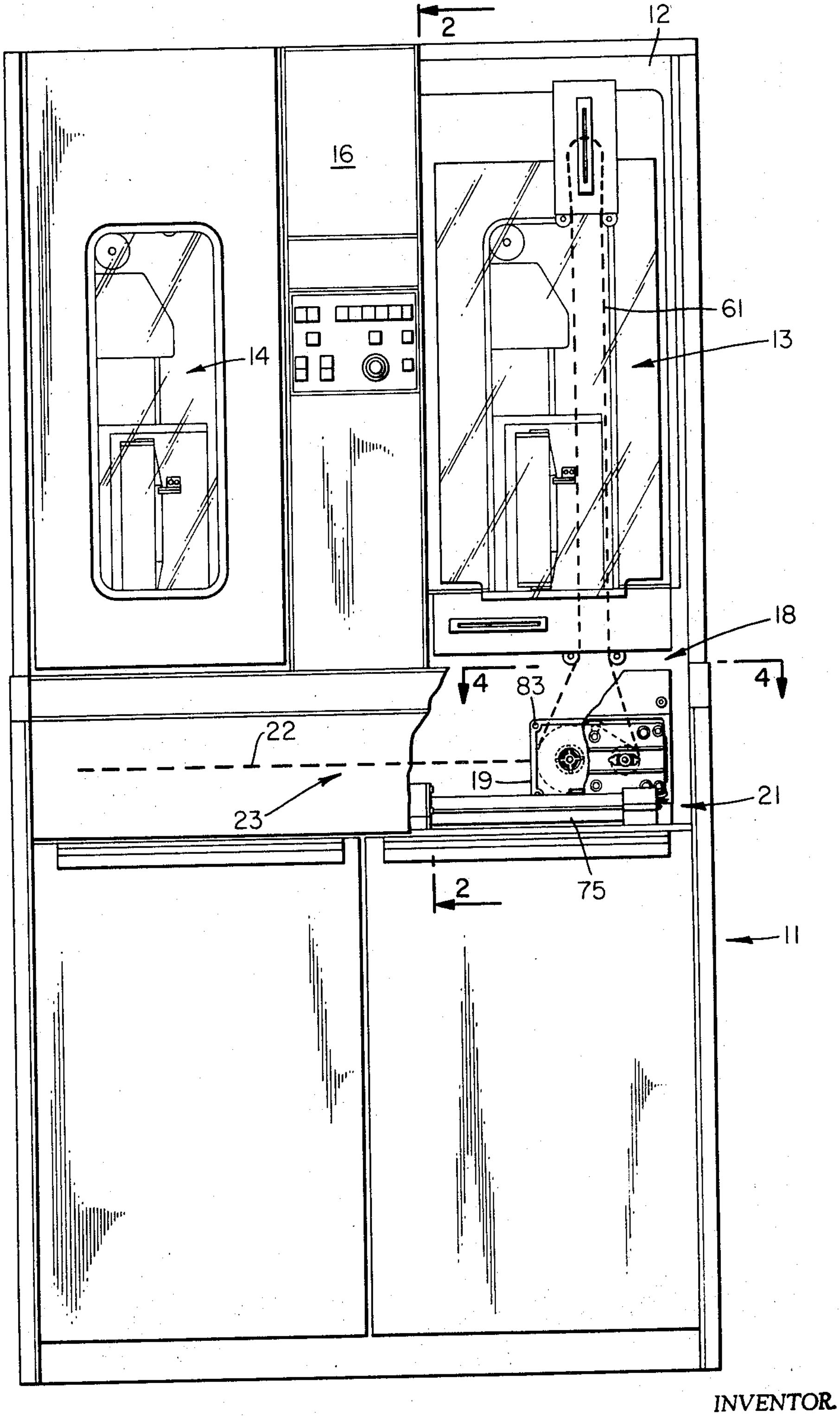
FIG. 1 is a broken-away front elevation view showing the apparatus of the invention.

Referring now to FIG. 1 there is shown a cabinet 11 and framework 12, mounting a pair of magnetic tape transports 13, 14 and defining a projecting portion 16 therebetween for housing a cassette storage carrousel 17. A holding means 18 is also shown for holding a cassette 19 in operative relationship with the transport 13; and a loading means 21 is also provided for moving the cassette 19 along a path 22 between the holding means 18 and a discharge point 23 of the carrousel. Further details of the cabinet are shown in co-pending design application D-126,389 "Magnetic Tape Video Cassette Machine" by Darell S. Staley, filed Mar. 19, 1971. Transport 14 also has an identical holding means 18 (not shown) on an extension of the path 22 and supplied by a similar loading means 21 (not shown).

Figure 3:
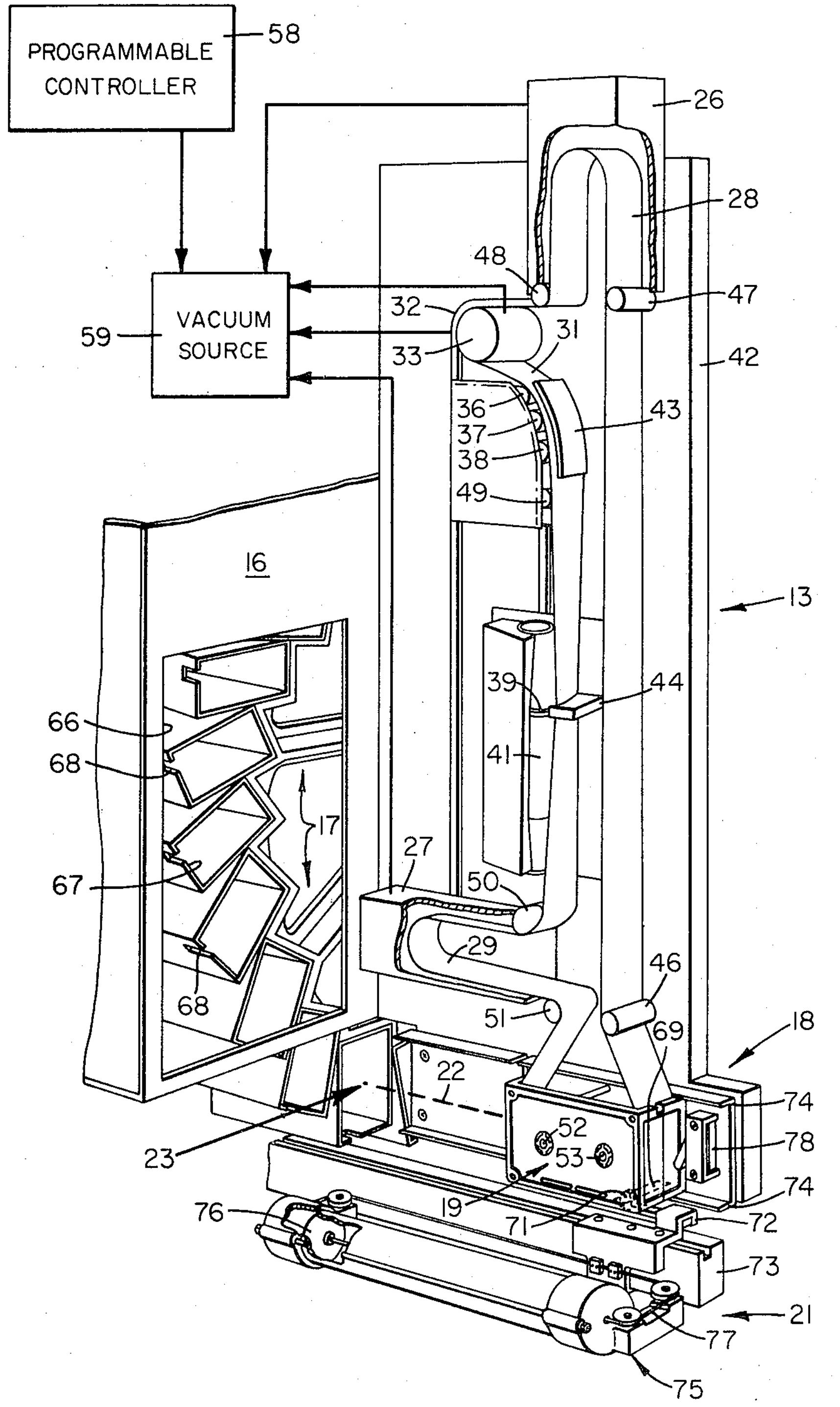
FIG. 3 is an enlarged partly exploded perspective view of a portion of the apparatus shown in FIGS. 1 and 2.

Referring now to FIG. 3, the general arrangement of the transport is shown in greater detail. Two vacuum columns 26 and 27 are provided to draw a takeup loop 28 and a supply loop 29, respectively, from the side of the cassette 19 on which the reel-to-reel run of tape is ordinarily positioned, and a third intermediate operating loop 31 may be pulled by means 32 for threading past a retractable capstan 33 and into engagement with an assembly of longitudinal transducing heads 36, 37, 38 and a rotating drum 39 of a transversely recording video head and drive means assembly 41. The capstan and its motor means are mounted on a movable mount (not shown) behind the top plate 42 of the machine and can be bodily moved in an axial direction through a conforming opening in the plate 42 to a retracted position completely beneath the plate 42 so as to clear a lateral loading path for the tape loop 31. A similarly retractable electro-magnetic shield element 43 is also mounted on the same movable mount as the capstan 33. The head assembly 41 has a retractable female guide 44 which also disappears beneath the surface of the plate 42 to clear a lateral loading path for the tape. The head assembly 41 is fully described in co-pending application Ser. No. 809,665 "Mount for Concave Tape Guide" by Dale P. Dolby, filed Mar. 24, 1969 now U.S. Pat. No. 3,629,515. In addition, air lubricated guide posts 46, 47, 48, 49, 50 and 51 are provided at various points along the tape path.

With the above general description of the structure, the threading and recording or playing functions of the transport can be explained. The reels 52, 53 of the cassette 19 positioned in the holding means 18 are engaged by a pair of driving spindles 56, 57 (FIG. 4), the motor means for which are controlled by a programmable controller 58 (FIG. 3), also controlling a vacuum source 59 to which the loop drawing means 26, 27, 32 are coupled. The controller 58 also controls the retraction and operative positioning of the capstan 33, shield 43 and female guide 44. These elements are normally retracted except when playing tape. When the cassette 19 is fully loaded and is ready for threading, the controller keeps the elements 33, 43, 44 in retracted condition and the supply reel 52 is held stationary ('-'locked"), and the takeup reel 53 is rotated in an unwinding direction while vacuum is drawn by all three means 26, 27, 32. A loop of tape is thus pulled substantially normally (perpendicularly) from the side of the cassette and is paid-out or "rolled" first into the column 27 to form the supply loop 29, thence across the rotatable head drum 39, thence around the heads 36–38 and into the means 32 to define the loop 31. The orifice of means 32 to vacuum is closed by the arrival of tape in loop 31, cutting off the flow of air and sharply increasing the vacuum level on the vacuum side of the orifice. A pressure sensitive transducer (not shown) of any standard type, senses this pressure change and generates pneumatic signal to the controller 58, which thereupon initiates the operative positioning of the capstan 33, shield 43 and female guide 44. While this signal is being transmitted, the tape continues to feed and enters column 26 to define the takeup loop 28. Columns 26 and 27 both have loop-length sensing devices of the lamp and photocell type, well known in the art, which generate signals to the controller during play-record and rewind operation for maintaining these loop lengths at a predetermined value, as by appropriate operation of the reels 52, 53. Such a signal from column 26 during threading is used to apply vacuum to the capstan 33 and to cut off vacuum to the means 32 so that the loop 31 is brought into frictional driving relation to the capstan. The apparatus is now in a "stand-by" mode, and further signals provided by the programmable controller 58 serve to initiate record or play mode with the capstan 33 and drum 39 both turning.

When the end of tape, or end of recorded "spot", is reached, suitable indications of known type on the tape are sensed by suitable means of known type and a signal is applied to the controller 58. If rewind is desired immediately, the controller retracts the capstan 33, shield 43 and female guide 44 and cuts off vacuum to supply column 27. There is no vacuum in means 32. The tape is thus caused to be stretched directly between guides 48 and 51 so as to be out of contact with the heads 36–38 and 39 (see also FIG. 1, the rewind path 61); only the loop 28 is maintained to prevent tape breakage, and the reels 52, 53 are rotated at high speed to transfer the tape back to the supply reel 52.

Occasionally, rewind will not be desired immediately after play. If for example, the cassette program sequence calls for the playing of a very short "spot" from one cassette on transport 13 e.g., there may only be time to unload the previous cassette from transport 14 without going through the rewind procedure, and to load and thread the subsequent cassette on transport 14, during the time that the intermediate cassette is playing the short spot on transport 13. In such event, the controller 58 can be made to skip the rewind procedure, to withdraw all tape from the transport to the cassette and immediately continue with the unloading and reloading operations. Rewind of the unrewound cassette can be deferred and later initiated by further programming of the controller 58. Returning for the moment to the preliminary steps of loading and operating the carrousel 17 to supply both transports 13 and 14, and referring to FIGS. 2 and 3, it will be seen that the carrousel may be hand loaded with four cassettes at a time through a side door 66 in the cabinet protrusion 16. To maintain a substantial balance in the partly loaded carrousel, the controller 58 is arranged to rotate the carrousel 180° or as nearly as possible thereto after each sequential group of four cassettes is hand loaded. For withdrawing cassettes at the discharge point 23, each cassette holding cage 67 of the carrousel has a slot 68 formed in the bottom, and a dog element 69 fits through the slot 68 at the discharge point and engages a transverse groove 71 in the cassette bottom. The dog 69 extends from a runner 72 that slides on a rail 73 parallel to path 22 for moving the cassette along the path 72, the cassette sliding on a set of four rail flanges 74 and 75, extending from channel shaped members. The runner 72 is moved by a cylinder 75 and has floating piston 76 assembly, the pistons being coupled on both sides to the runner 72 by means of a pulley-mounted line 77. At the end of its loading travel, the cassette 19 encounters a stop consisting in part of a microswitch 78, which when closed by the cassette, sends a signal to controller 58 to initiate the second stage of loading, directed toward precision positioning the cassette with the spindles 56, 57 in driving engagement with the cassette reels 52, 53 (FIG. 4).

The stopping of the cassette is further provided in a cushioned manner by the piston 76, which encounters a build-up of pressurized air at the end of the cylinder caused by reduction of the number of bleeding orifices as the piston progressively occludes them.

Figure 4:
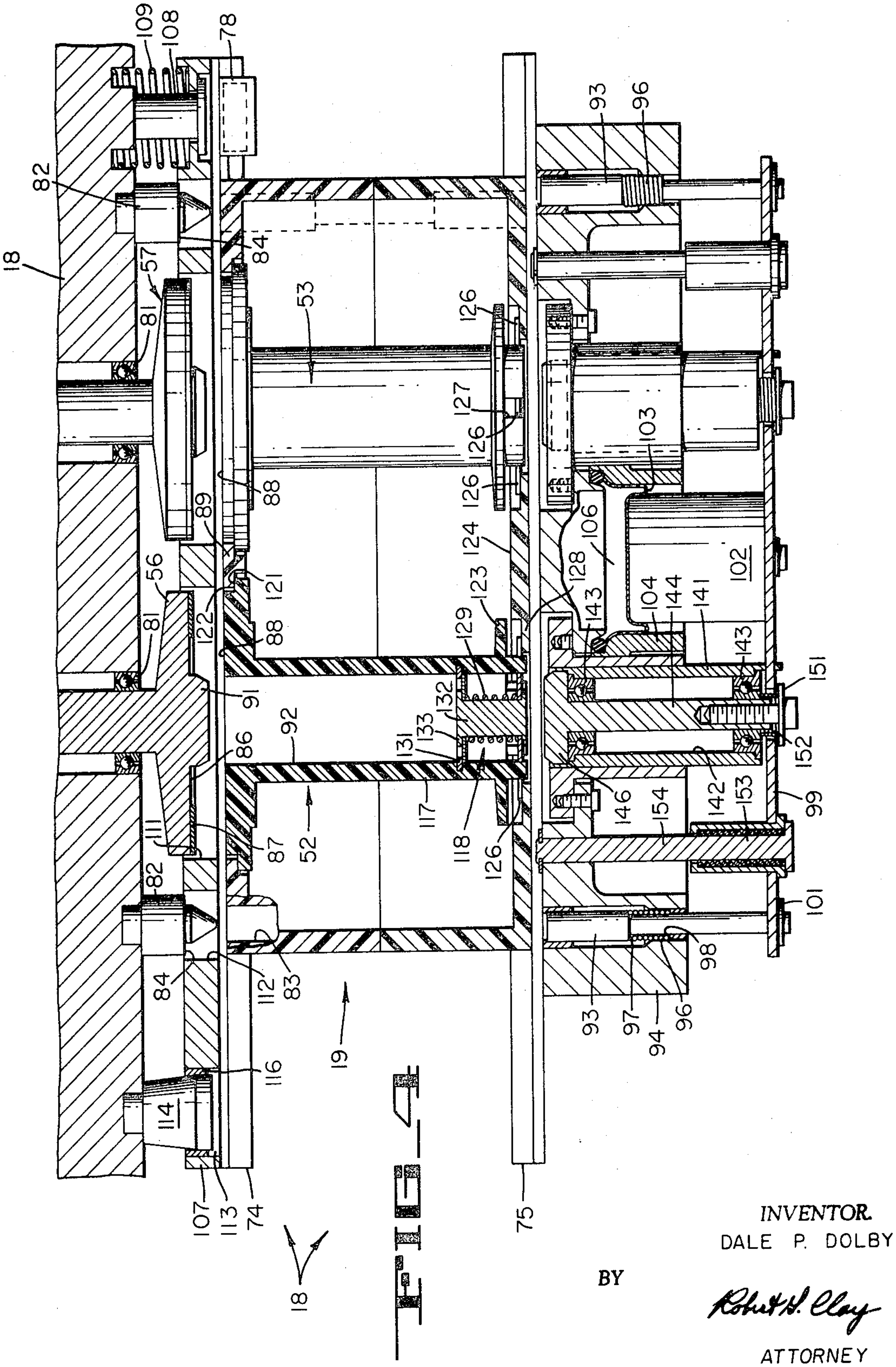
FIG. 4 is an enlarged plan section view taken on the plane 4—4 of FIG. 1.

As shown in FIG. 4, the spindles 56, 57 are mounted in anti-friction bearings 81 to project through the transport top plate 18. Also mounted on top plate 18 are four precision positioning pins 82 aligned for engaging conforming recesses 83 in the side of the cassette. The pins 82 have shoulders 84 against which seat the side of the cassette in operating position, at precisely the right distance from top plate 18 so that the high friction turntables 86, upon which are mounted rubber-cork rings 87, pressurizingly engage the adjacent reel flanges 88 and hold the flanges 88 out of frictional engagement with the side wall 89 of the cassette. Thus the reels are freed for rotation, and they are centered by means of projecting portions 91 of the spindles engaging hollow central bores 92 of the reel hubs.

To move the cassette into this described operating position from the position shown in FIG. 4, there are provided four pressure pins 93 mounted for sliding movement in a fixed casting 94 forming part of the framework of the machine. The pressure pins are loaded by means of compression springs 96 bearing against shoulders 97 and 98 on the pins and casting, respectively, so as to engage and urge the cassette 19 toward the spindles when the pins 93 are released. In the position shown in FIG. 4, however, the pins 93 are restrained as by a plate 99 through which the pins pass freely, and snap-rings 101 secured to the pins 93 and engaged by the plate 99; and the plate 99 is held in the illustrated position by means of an air-pressure piston 102 and flexible diaphragm 103 coupled to the plate 99 and defining with the casting 94 and a mounting ring 104 an air pressure chamber 106, the latter being pressurized only during non-operating modes of the transport so that upon failure of the air pressure system the springs 96 retain the cassette in operating position.

When the pins 93 begin to push the cassette toward the spindles, the cassette moves away from the off-side rails 75, which are fixed to the framework-mounted casting 94; but the cassette cannot move away from the near-side rails 74, which must be yieldingly mounted on a yielding plate 107. The plate 107 is restrained by four capped studs 108 extending from the fixed plate 18, and is springloaded as by springs 109 to tend to move to the position of FIG. 4. The springs 109 are weaker than springs 96 (e.g. 1.4 lb. recovery force for each spring 109 in the illustrated position as compared with 2.8 lb. recovery force for each spring 96 in the illustrated position), and the springs 94 are thus always able to overcome springs 109 when the chamber 106 is de-pressurized.

The yielding plate 107 has openings 111 and 112 for the spindles and pins 82 respectively, and two openings 113 for precision positioning of the plate 107 in the illustrated position, as by means of tapered studs 114 extending from the plate 18 and snugly engaging bearing rings 116 in the plate 107 in the illustrated position. The studs 114 are tapered convergingly toward the plate 18 so as to free the yielding plate for lateral shifting or accommodation, as the cassette positions itself upon the pins 82.

The reels 52, 53 are constructed in two parts 117, 118 so as to be releasably frictionally engaged with the walls of the cassette when the cassette is removed from the holding means. Thus the reels are braked against unwinding and spilling the tape. The part 117 of each reel generally comprises the tape winding hub of the reel, including the hollow central bore 92, and the spindle engaging reel flange 88. The flange 88 and wall 89 of the cassette have mating shoulders 121, 122 to effect the braking engagement described. A tape retaining reel flange 123 is also formed on the other end of the hub, but never engages the corresponding side wall 123 of the cassette. Instead a cruciform spider element 126, which fits in four end slots 127 of the hub, is arranged to engage shoulders 128 of the wall 124. The spider 126 is springloaded away from flange 88 as by a compression spring 129 bearing against the spider and an interior snap-ring 131 fitted into a corresponding groove in the bore 92 of the reel. A shaft 132 extends from the spider and bears on a flange 133 retaining the spider on the ring 131. For loosening the reel brake, the spider 126 must be compressed during the positioning process; and to this end the plate 99 mounts a tubular cylinder 141 which slides in a bearing 142 affixed to the casting 94. Inside the cylinder 141 a pair of anti-friction bearings 143 serve to mount a shaft 144 for rotation, and an expanded head 146 on the shaft 144 is arranged to bear solidly against the adjacent bearing 143 and to centeringly engage the spider 126 and bore 92 of the reel when the plate 99 moves toward the spindles. The end of the shaft 144 extends loosely through the plate and is retained by a washer 151 and spring 152 engaging the adjacent bearing 143 so that the shaft 144 is freely rotatable with respect to the plates 99. The plate 99 is urged inwardly by four springs 153 compressed between the plate 99 and the heads of four studs 154 extending from the casting 94, and the four springs 153 exert substantially greater total force (e.g. 7lb. apiece) than do the two reel brake springs 129 (e.g. 7 ½ lb. apiece) in the position illustrated. Consequently the shafts 144 can always overcome the braking springs 129 when the chamber 106 is de-pressurized. The dimension of the apparatus are furthermore arranged so that the springs 96 urge the cassette nearly home to operating position against shoulder 84 of studs 82 and the flange 88 fully home against the turntable 87, before the heads 146 the push the spiders 126 far enough to release the reel brakes.

Figures 2, 5:
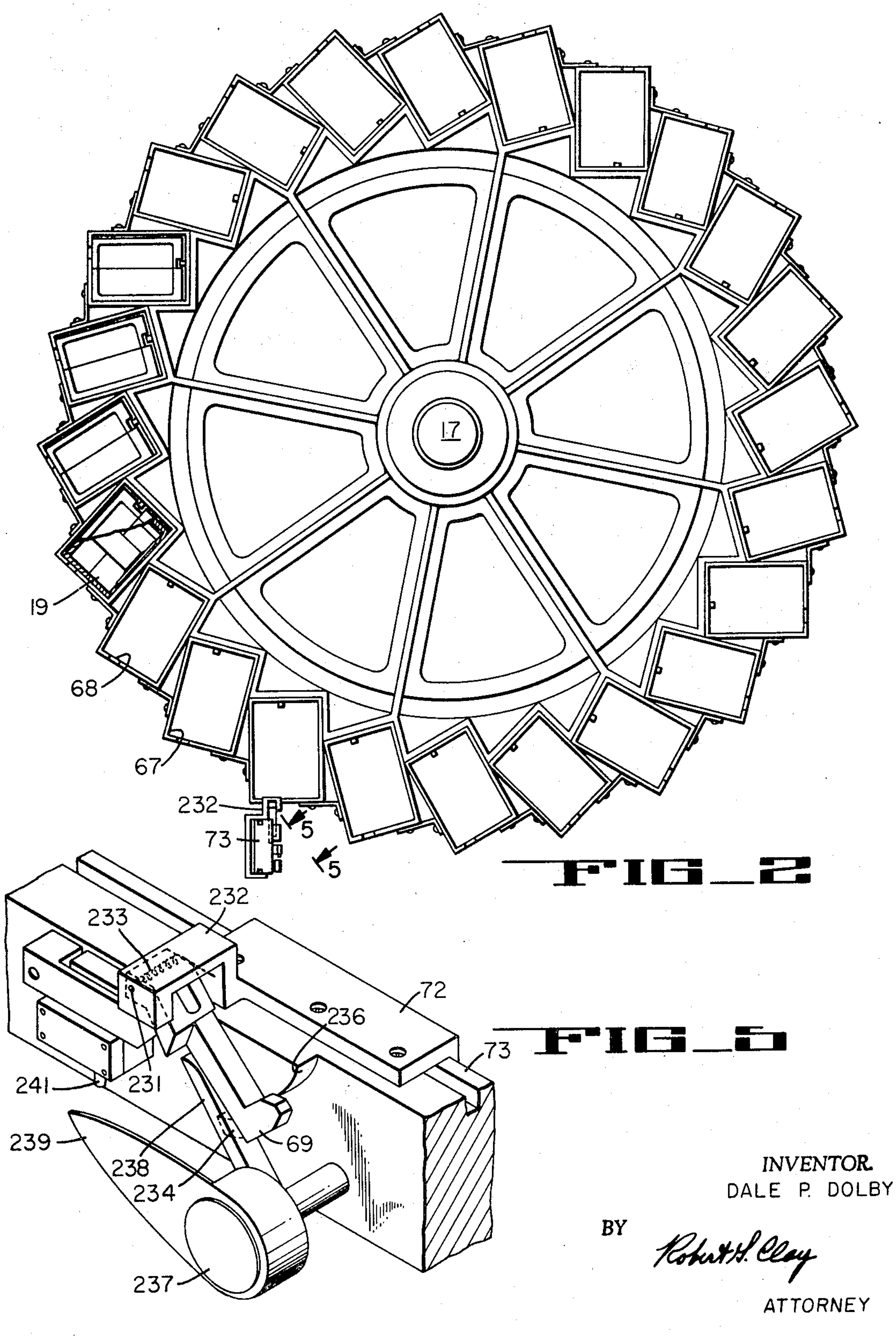
FIG. 2 is an enlarged side elevation view of the carrousel, taken on the plane 2—2 of FIG. 1.
FIG. 5 is an enlarged perspective view taken substantially from the direction of lines 5—5 of FIG. 2.

The operation of the latching mechanism for the cassettes is illustrated in FIG. 5. The dog 69 is pivoted by a pin 231 to a bracket 232 of the runner 72 and is loaded by a spring 233 into a normally downwardly retracted position when the runner is positioned beneath the carrousel. An extension 234 of the dog rests below a ledge 236 of the rail 73 in this position but may be moved up as by operation of a rotary solenoid 237 from the armature of which extends an arm 238. At the upper limit of the swing of arm 138, another arm 239 extending from the armature of the solenoid actuates a microswitch 241 to cause the controller to operate the air cylinder 76 to move the runner. The extension 234 of the dog having by this time cleared the ledge 236, the runner moves along the rail, and thereafter the extension 234 riding on the upper surface of the ledge 236 prevents retraction of the dog. Of course in coming up to the raised position, the dog has engaged the slot 71 in the cassette, and thereafter carries the cassette along the cassette guiding rails 74, 75 to the holding means.

What is claimed is:

1. A magnetic tape cassette transport combination comprising:

means for holding said cassette in operative relationship with said transport with the reel-to-reel tape run of said cassette exposed to said transport on one side of said cassette;

vacuum column means for drawing a takeup loop of said tape substantially normal to said one side of said cassette;

capstan and magnetic transducing means positioned at one side of said takeup loop and out of contact therewith; and means, forming part of said vacuum column means, for drawing said one side of said takeup loop toward said capstan and into transducing relation with said transducing means to define an operating loop for said tape.

2. The combination recited in claim 1 wherein:

said vacuum column means also includes means for drawing a supply loop of said tape between said cassette and said transducing means.

3. The combination recited in claim 2, wherein:

said capstan is a differential-pressure capstan retractable to free said operating loop, and movable to an operating position to cause frictional engagement of said tape on the concave side of said operating loop, between said transducing means and said takeup loop.

4. The combination recited in claim 3, wherein:
spindle and motor drive means are provided for engaging the reel of said cassette in said operative relationship thereof;
control means are provided for said motors, capstan and vacuum column means;
said control means having a thread mode programmed therein for retracting the capstan and then locking the cassette supply reel while unwinding the cassette takeup reel to produce the supply loop, the operating loop, and the takeup loop in that order; and
a sensing device is provided for producing a signal to said control means when said operating loop has been formed;
said control means in said threading mode being further programmed to move said capstan to said operating position upon receipt of said operating loop means and to differentially pressurize said capstan to cause said frictional engagement of tape and capstan.

5. The combination recited in claim 4, wherein:
said control means also has a rewind mode programmed therein in which said capstan is retracted with said operating and supply loop means disabled, and the takeup loop means and reel drive means above operating, to rewind said tape at high speed and out of contact with said transducing means.

6. The combination recited in claim 5, wherein said transducing means includes:
a transversely scanning rotating head drum means and motor and female guide means therefore, said female guide means being of the type that is retractable to clear a lateral loading path for the tape; and
longitudinal head means arranged on a first curved path downstream from said rotating head so as to provide substantial wrap of said tape on said longitudinal heads between said rotating head and said capstan;
said female guide being coupled to said control means for retraction and operative positioning concurrently with said capstan.

7. The combination recited in claim 6, wherein:
electromagnetic shielding means is provided for said longitudinal head means on a second curved path substantially concentric with said first curved path and spaced therefrom to permit passage of said tape between said longitudinal heads and said shielding means;
said shielding means being also retractable to clear a lateral loading path for said tape and being coupled to said control means for conjoint movement with said capstan and female guide between the retracted and operating positions thereof.

8. The combination recited in claim 2, wherein;
a rotating carroussel is provided for holding a plurality of said cassettes and for selectively positioning one cassette at a time at a discharge point lying on a path parallel to the axis of said carroussel and leading to said means for holding the cassette in said operative relationship with said transport; and
means are provided for moving said cassette along said path in either direction between said carrousel and said holding means.

9. The combination recited in claim 8, wherein:
the orientation of said cassette in said carroussel at said discharge point and in movement along said path to said holding means and in said holding means is such that the axis of each reel is perpendicular to said path between the carroussel and holding means;
the orientation of said transport being such that said reel driving spindles are also perpendicular to said path between said carrousel and holding means and are aligned with said reels when said cassette is in said holding means.

10. The combination recited in claim 9, wherein said holding means includes:
fixed and yielding track means positioned to carry said cassette in sliding movement along said path and into and out of a first position of non-contact alignment of the reels and spindles, the yielding trace means being on the same side of the cassette as the spindles; and
positioning means for engaging the cassette on the side thereof opposite the spindles and for pushing the cassette away from the fixed track means and into operative engagement of the reels and spindles.

11. The combination recited in claim 10, wherein said positioning means also includes:
means mounting a pair of freely rotating counterspindles for axial movement to engage the cassette reels at the ends thereof opposite the drive spindles, said counterspindles cooperating with the drive spindles to suspend the reels in precision alignment independently of the cassette housing and substantially out of frictional contact therewith.

12. The combination recited in claim 11, wherein:
said cassette side engaging means is springloaded toward the second operating position with a force sufficient to cause yielding of said yielding track means, but is restrained in the first retracted position by said counterspindle mounting means;
the relative travel dimension of said cassette side engaging means and counterspindles being such that said side engaging means engages and moves said cassette substantially to second operating position before said spindles and counterspindles release said cassette reels from said frictional contact with said cassette housing.

13. The combination recited in claim 12, wherein:
said counterspindle mounting means is moved to retracted first position by an air pressure cylinder means;
whereby said cassette remains in operating second position upon operative failure of the air-pressure cylinder means.

14. The combination recited in claim 13, wherein: each reel of said cassette is formed in two parts each defining one axial end of the reel and springloaded apart to bear frictionally against the walls of the cassette housing to prevent unwinding of the reels when the cassette is not in the transport;

the operative second position of said counterspindles being such that the two parts of each reel are compressed together and are freed from engagement with the cassette walls for unhampered rotation during operation;

the counter spindle mounting means being springloaded toward second operating position with a force sufficient to overcome the springloading of said reel parts when said air pressure cylinder means of not operating.

15. The combination recited in claim 8, wherein:

two of said transports are provided on opposite axial sides of said rotating carrousel;

said two transports having a common cassette loading path through said carrousel discharge point; and said cassette moving means being selectively operable to move said cassette along said common path in either direction between said discharge point and either of said transports.

16. The combination recited in claim 8 wherein:

solenoid operated latching means are provided for engaging said cassette in said carroussel at said discharge point and moving said cassette to and from said holding means;

said latching means including a slide riding on a slide rail beneath said cassette path, a dog element pivoted on said slide for movement between a retracted position and an extended position above said rail and engaging said cassette;

said dog having an extension portion seating in a cut away portion of said rail at said discharge point but resting on top of the rail elsewhere in the extended position of the dog so as to prevent return of the dog to retracted position;

said solenoid being arrange to move said dog to extended position and thereupon to cause movement of the slide to engage the extension portion of the dog with the slide to maintain the extension of the dog.

* * * * *